United States Patent [19]
Vishey

[11] Patent Number: 5,758,924
[45] Date of Patent: Jun. 2, 1998

[54] VEHICLE SEAT LATERAL AND LUMBAR SUPPORT BLADDER ASSEMBLY

[75] Inventor: Gregory J. Vishey, Grosse Pointe Woods, Mich.

[73] Assignee: Lear Corporation, Southfield, Mich.

[21] Appl. No.: 863,821

[22] Filed: May 27, 1997

[51] Int. Cl.⁶ .................................................. A47C 7/46
[52] U.S. Cl. .............................. 297/284.4; 297/284.6; 297/218.1; 297/219.1; 297/228.13
[58] Field of Search ....................... 297/284.4, 284.6, 297/218.1, 218.3, 218.5, 219.1, 228.13, 230.1, 230.11, 230.13, 452.3, 452.31, 452.34, 452.41, 452.59, 452.38

[56] References Cited

U.S. PATENT DOCUMENTS

| | | | |
|---|---|---|---|
| 3,326,601 | 6/1967 | Vanderbilt et al. | 297/284.6 |
| 3,995,892 | 12/1976 | Hellman et al. | 297/218.1 |
| 4,497,517 | 2/1985 | Gmeiner et al. | 297/284.6 |
| 4,580,837 | 4/1986 | Bayley | 297/284.6 X |
| 4,746,168 | 5/1988 | Bracesco | 297/284.6 X |
| 4,789,201 | 12/1988 | Selbert | 297/218.1 |
| 4,807,931 | 2/1989 | Ishida et al. | 297/284.6 |
| 4,832,400 | 5/1989 | Aoki et al. | 297/284.4 |
| 4,856,844 | 8/1989 | Isono | 297/284.6 |
| 4,966,410 | 10/1990 | Bishai | 297/284.6 |
| 5,076,643 | 12/1991 | Colasanti et al. | 297/284.6 |
| 5,137,329 | 8/1992 | Neal | 297/284.6 |
| 5,152,579 | 10/1992 | Bishai | 297/284.6 |
| 5,190,348 | 3/1993 | Colasanti | 297/284.6 |
| 5,251,962 | 10/1993 | Saito | 297/219.1 X |
| 5,529,377 | 6/1996 | Miller | 297/284.6 |
| 5,562,324 | 10/1996 | Massara et al. | 297/284.6 |
| 5,658,050 | 8/1997 | Lorbiecki | 297/284.6 X |
| 5,690,384 | 11/1997 | Rossi | 297/228.13 X |

FOREIGN PATENT DOCUMENTS

| | | | |
|---|---|---|---|
| 2666974 | 3/1992 | France | 297/284.6 |
| 3700830 | 8/1987 | Germany | 297/219.1 |

*Primary Examiner*—Peter R. Brown
*Assistant Examiner*—Rodney B. White
*Attorney, Agent, or Firm*—Brooks & Kushman P.C.

[57] ABSTRACT

A vehicle seat assembly includes a seat backframe having a plurality of attachment holes formed therethrough. A trim cover includes an attachment strip with a plurality of trim attachment apertures therethrough aligned with the attachment holes in the backframe. A plurality of Christmas-tree fasteners cooperate with the attachment holes and with the trim attachment apertures for securing the trim cover to the backframe. A lateral and lumbar support bladder subassembly is secured to the backframe by the Christmas-tree fasteners. The subassembly includes a backing plate with first and second lateral support bladders and first and second lumbar support bladders secured to the backing plate. A method of assembling a seat includes installing the lateral and lumbar support bladder subassembly as a single piece to the backframe using the Christmas-tree fastener for attachment.

10 Claims, 3 Drawing Sheets

5,758,924

VEHICLE SEAT LATERAL AND LUMBAR SUPPORT BLADDER ASSEMBLY

TECHNICAL FIELD

The present invention relates to a vehicle seat assembly, and more particularly to a vehicle seat lateral and lumbar support bladder assembly which is attached to the seat backframe by the same fasteners which attach the trim to the backframe.

BACKGROUND OF THE INVENTION

Current vehicle designs often include inflatable lumbar bladders for seat comfort and contour adjustment. More advanced seating structures also include lateral bladders which are used to adjust lateral support of the seat occupant along lateral edges of the seat for side torso support of the seat occupant.

Assembly of lateral and lumbar support bladders and their supporting structure onto a vehicle seat backframe in a seat assembly is typically a time-consuming process which requires several independent parallel detail processes which lead to a main assembly operation in which various components are sequentially assembled onto a seat backframe.

Such assembly processes may comprise 25 or more independent components which must be assembled onto the seat backframe either independently or as a subassembly. A normal process would include riveting a lateral paddle to a hinge, sandwiching a bladder between paddle and the backframe, and driving additional rivets into the hinge for attachment of the paddle assembly to the backframe. These steps are then repeated on the opposing side of the backframe to install the opposing paddle, hinge, and lateral bladder. Next, a lumbar bladder and backing plate assembly, which is the product of a previous subassembly operation, is riveted onto a center portion of the seat backframe. This typical assembly process requires handling and assembly of many independent components prior to final assembly onto the seat backframe.

Accordingly, it is desirable to provide a vehicle seat lateral and lumbar support bladder assembly which may be installed onto a vehicle seat backframe as a single component, thus eliminating the various subassembly operations, as well as the numerous rivet attachments, etc.

DISCLOSURE OF THE INVENTION

The present invention overcomes the above-referenced shortcomings of prior art vehicle seat lateral and lumbar support bladder assemblies by providing such an assembly in which all components are mounted onto an enlarged backing plate for attachment to the backframe as a single component, and the backing plate includes attachment apertures which align with fasteners already existing on the assembly for attaching the seat trim to the backframe, thus eliminating the need for any fasteners which secure only the lateral and lumbar support bladder assembly to the backframe.

More specifically, the present invention provides a vehicle seat assembly including a seat backframe having a plurality of attachment holes formed therethrough, a trim cover having an attachment strip with a plurality of trim cover attachment apertures therethrough, and a plurality of Christmas-tree fasteners cooperating with the attachment holes and with the trim attachment apertures for securing the trim cover to the backframe. Additionally, a lateral and lumbar support bladder subassembly is secured to the backframe by the same Christmas-tree fasteners. The lateral and lumbar support bladder subassembly includes a backing plate with first and second lateral support bladders and first and second lumbar support bladders secured to the backing plate.

The present invention also provides a method of assembling lateral and lumbar support bladders on a vehicle seat backframe. The method includes: 1) providing a seat backframe having a plurality of attachment holes formed therethrough, as well as a central aperture formed therethrough; 2) pre-attaching a lateral and lumbar support bladder subassembly to the central opening in the backframe, wherein the subassembly includes a backing plate with first and second lateral support bladders and first and second lumbar support bladders secured to the backing plate, and wherein the backing plate includes a plurality of backing plate attachment apertures formed therethrough; and 3) simultaneously securing a trim cover and the backing plate to the seat backframe by inserting a plurality of Christmas-tree fasteners through a portion of the trim cover, and further through the plurality of backing plate attachment apertures and through the attachment holes in the seat backframe.

Accordingly, an object of the present invention is to provide a vehicle seat lateral and lumbar support bladder assembly in which the entire assembly is installed onto the seat backframe as a one-step assembly operation.

A further object of the present invention is to provide a vehicle seat lateral and lumbar support bladder assembly which does not require its own fasteners for attachment to the seat backframe.

A further object of the present invention is to provide a vehicle seat lateral and lumbar support bladder assembly which utilizes existing seat assembly fasteners which fasten the trim cover to the backframe for securing the bladder assembly to the backframe.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
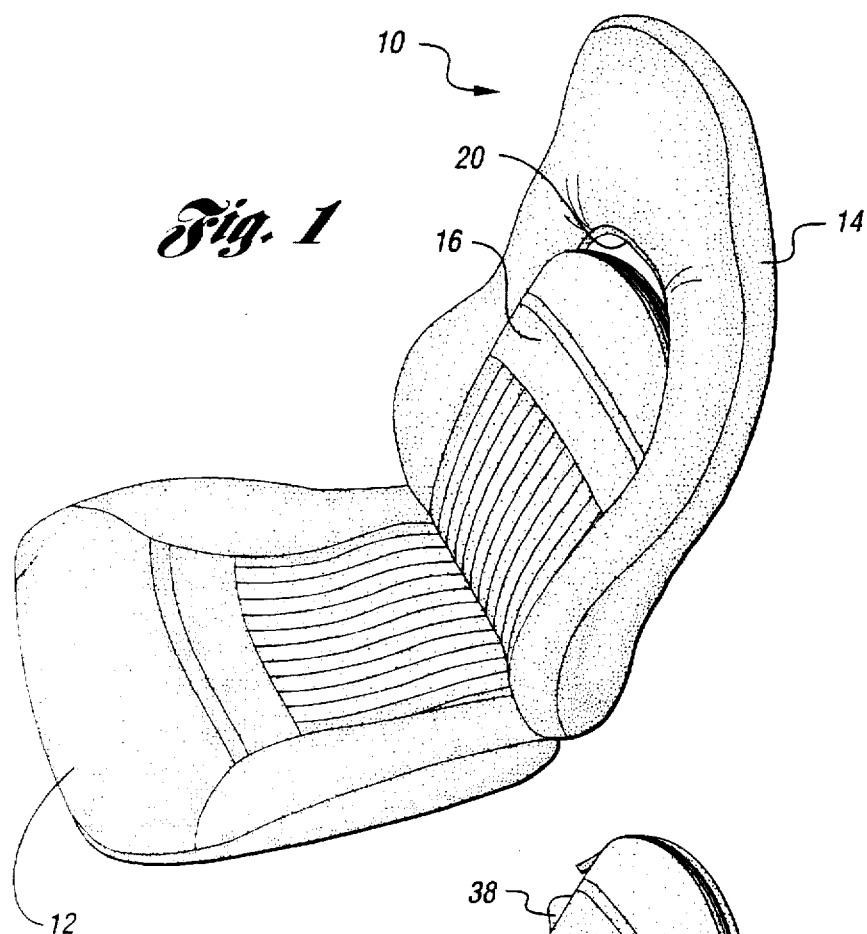
FIG. 1 shows a perspective view of a seat assembly in accordance with the present invention.

Referring to FIG. 1, a vehicle seat assembly 10 is shown in accordance with the present invention. As shown, the vehicle seat assembly 10 comprises a lower seat 12, a substantially U-shaped outer seat cushion 14, and a removable cushion insert 16 positioned within the central opening 18 (shown in FIG. 2) of the substantially U-shaped outer cushion 14. With the removable cushion insert 16 installed within the U-shaped outer cushion 14, an aperture 20 is formed therebetween. The U-shaped outer cushion 14 and insert 16 are supported by the seat backframe 22 (shown in FIG. 2).

Figure 2:
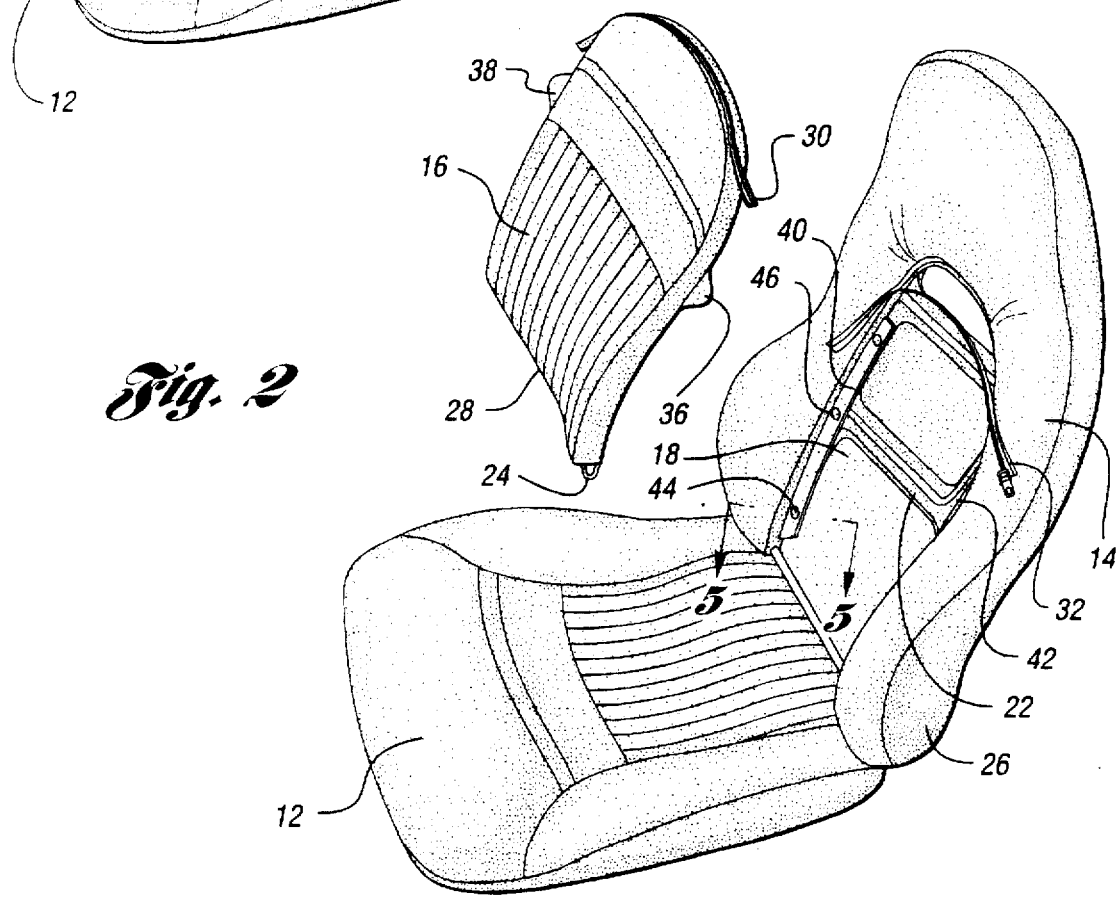
FIG. 2 shows a partially exploded perspective view of a vehicle seat assembly in accordance with the embodiment shown in FIG. 1.

As shown in FIG. 2, when the cushion insert 16 has been placed within the central opening 18, the insert zipper 30 cooperates with the outer cushion zipper 32 for attachment. A J-strip connector 24 connects the lower portion 28 of the cushion insert 16 to a mating arrow strip at the bottom of the trim (riot shown), and plastic strips 36.38 extend from the removable insert for further attachment. The outer cushion 14 is covered by a trim cover 26, which includes plastic strips 40,42 sewn thereon to facilitate connection of the trim cover 26 to the backframe 22.

As shown in FIG. 2, the trim cover fasteners strips 40,42 include attachment apertures 44,46 therethrough. These attachment apertures 44,46 are aligned with apertures 48,50 (shown in FIG. 3) on the backframe 22 for attaching the trim 26 to the backframe 22. These apertures 44, 46, 48, 50 are configured to receive a Christmas-tree fastener 52, as described below with reference to FIG. 5, for attachment. Preferably, the attachment apertures 36,38 are slots to permit movement of the insert 16 in reaction to lumbar inflation. Attachment apertures 44 and 46 are slots to permit for locational variation in the U-shaped outer cushion 14 and insert 16, as well as the backing plate 76 with respect to the backframe 22.

Figure 3:
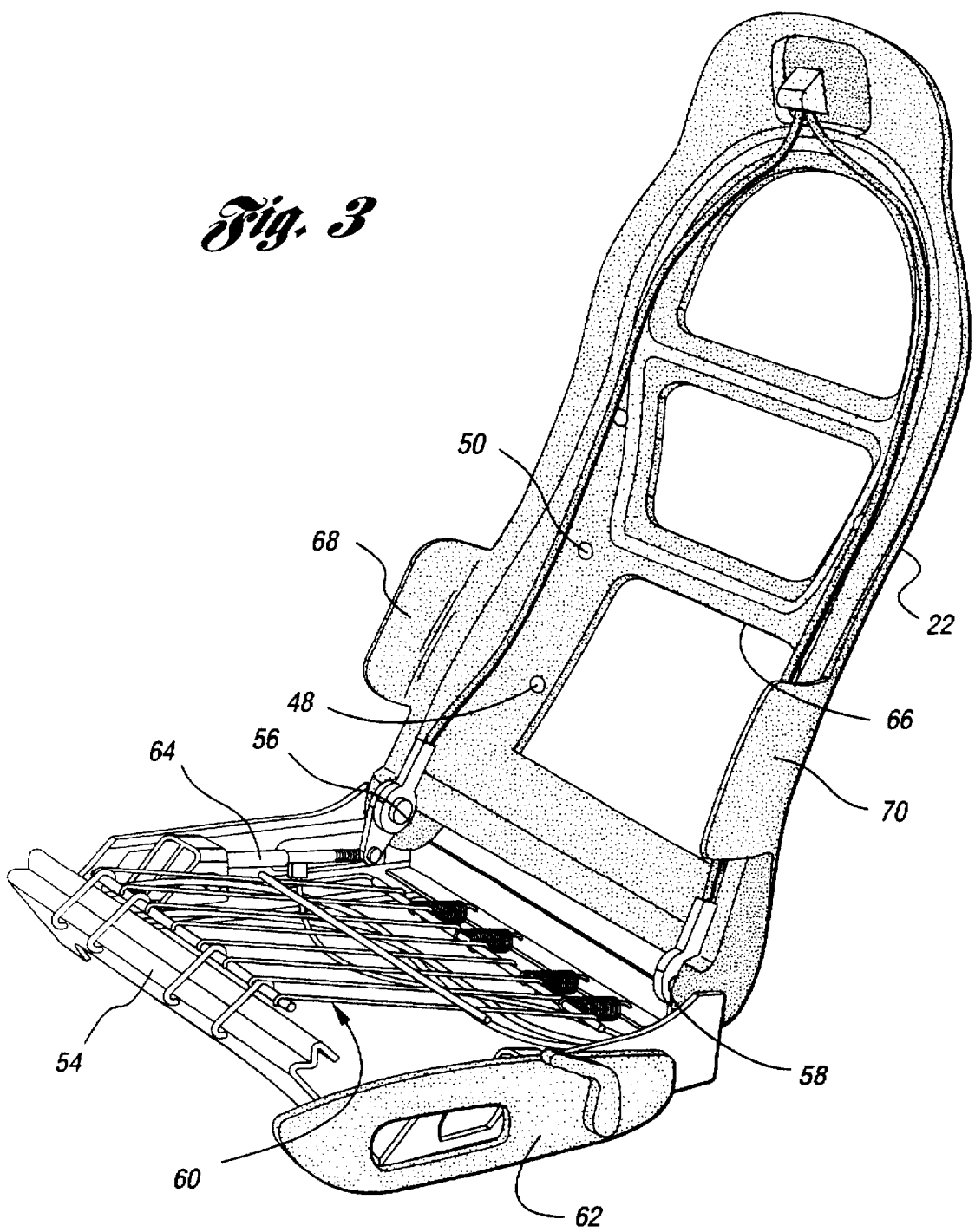
FIG. 3 shows a perspective view of a seat frame assembly for use with the present invention.

As shown in FIG. 3, the vehicle seat assembly includes a lower seat frame 54 pivotally connected to a contoured structural reaction injection molded seat backframe 22 along hinge points 56,58. The lower seat frame 54 includes a cushion seat frame assembly 60, side shield 62, and a recliner mechanism 64. The seat backframe 22 includes a central opening 66, as well as side extenders 68,70.

The lateral and lumbar support bladder assembly of the present invention is positioned over the central opening 66 and across the side extenders 68,70 and includes apertures which align with the attachment apertures 48,50 in the backframe 22 for attachment thereof. The lateral and lumbar support bladder system assembly 74 is shown schematically in FIG. 4 and described below.

Figure 4:
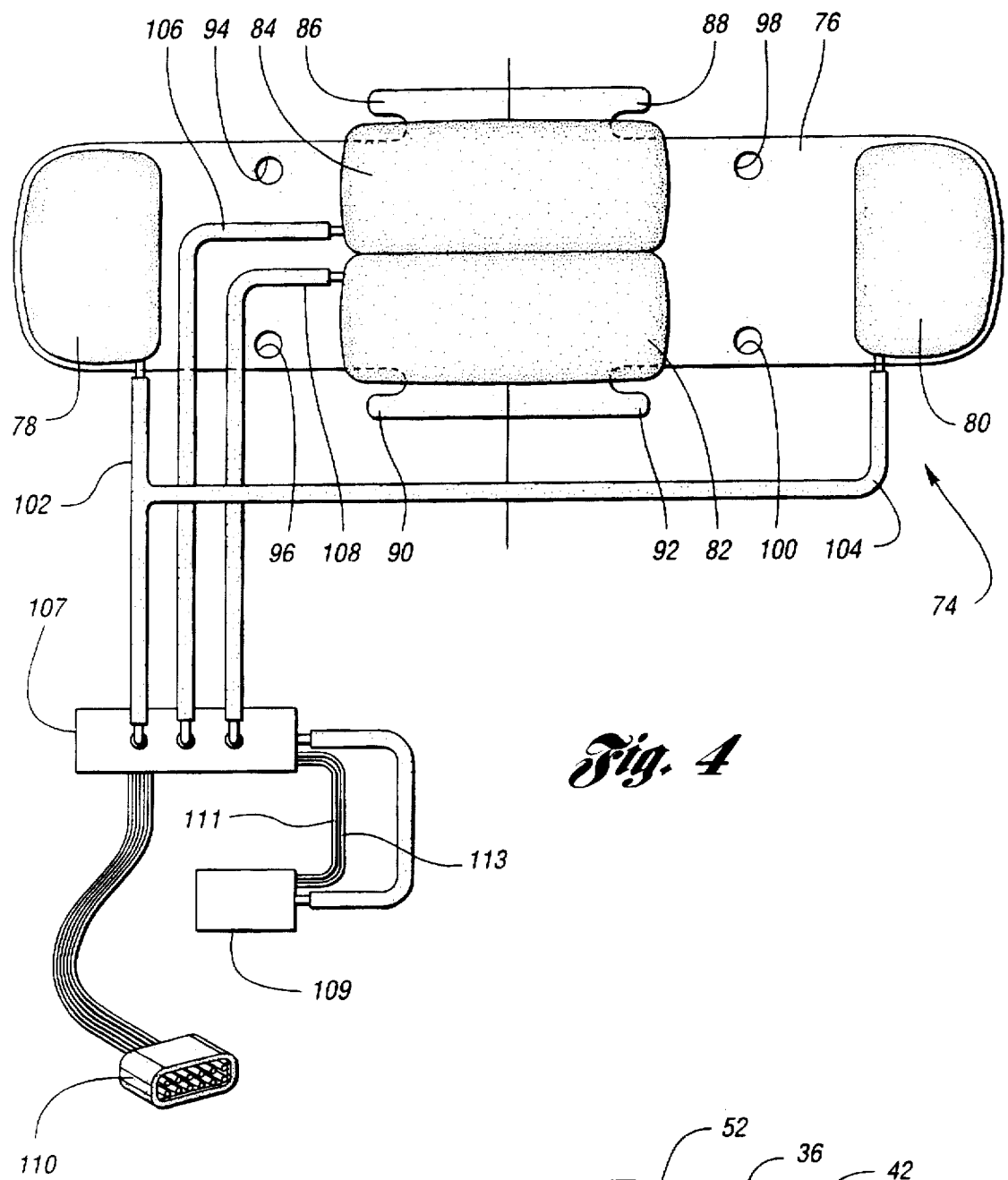
FIG. 4 shows a schematically arranged plan view of a vehicle seat lateral and lumbar support bladder system in accordance with the present invention and FIG. 5 shows a sectional view taken at line 5—5 of FIG. 2.

Referring to FIG. 4, the lateral and lumbar support bladder system assembly 74 comprises an enlarged backing plate 76 with first and second lateral support bladders 78,80 attached to opposing ends thereof. Lumbar bladders 82,84 are connected to the central. portion of the backing plate 76. The backing plate 76 also includes means for attaching the backing plate 76 to the central opening 66 (shown in FIG. 3) of the backframe 22 for temporarily holding the lateral and lumbar bladder support assembly 74 in position prior to rigidly fastening the assembly 74 to the backframe 22. The means for temporarily attaching the backing plate comprises flexible tabs 86, 88, 90, 92 extending therefrom for cooperation with the central opening 66 for temporarily securing the assembly 74 to the backframe 22. The backing plate 76 preferably comprises a thin flexible plastic material, such that the tabs 86, 88, 90, 92 are sufficiently flexible to allow an easy installation thereof within the central opening 66 of the backframe 22, while being sufficiently rigid to ensure that the assembly remains captive during handling and assembly.

The backing plate 76 is also provided with backing plate attachment holes 94, 96, 98, 100 which are configured for alignment with the respective attachment holes 48,50 on the opposing sides of the backframe 22, as well as with the trim attachment apertures 44,46 on the fastener strips 40,42 of the trim cover 26, shown in FIG. 2.

Figure 5:
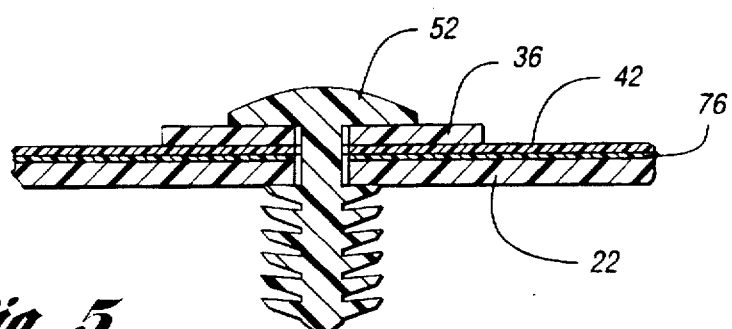

Accordingly, as illustrated in FIG. 5, a plurality of Christmas-trees 52 may be inserted through the insert cover fastener strip 36 through the trim cover fastener strip 42, through the backing plate 76, and finally through the backframe 22 for attachment of the assembly. Accordingly, in this configuration, the lateral and lumbar bladder support assembly 74 does not require its own fasteners for attachment to the backframe 22. Rather, it is merely provided with attachment apertures 94, 96, 98, 100 which align with the attachment features of the backframe and attachment strip to facilitate use of the Christmas-tree fasteners 52 in attaching the bladder assembly 74 to the backframe 22. When installed in this manner, the backing plate 76 loads the Christmas-tree fasteners 52 in the shear direction, thereby bridging the backframe aperture 66 and providing a reaction force for directing the bladder inflation toward the occupant.

This one-piece backing plate assembly design enables the manufacturer to utilize a single backframe 22 design which does not require special machining or processing to accommodate this feature, thereby enabling the use of the single backframe design for base and deluxe seat assemblies.

Referring back to FIG. 4, the lateral and lumbar bladder support assembly 74 further includes a plurality of tubes 102, 104, 106, 108 for directing pumped air into the bladders 78, 80, 82, 84. A control module 107 and pump 109 are also provided for controlling pressurization of the various bladders 78, 80, 82, 84, independently or in combination in response to user commands. The pump 109 is electrically communicated with the control module 107 by a lead wire 111 and ground wire 113. An electrical connector 110 is also provided for interfacing the assembly 74 with the vehicle electrical system. A switch or series of switches is provided for user access for communication with the control module 107 for controlling bladder inflation.

Accordingly, in this configuration, the lateral and lumbar support bladder assembly 74 may be attached to a vehicle -seat backframe 22 as a single piece, which greatly simplifies assembly. The attachment apertures 94, 96, 98, 100 in the backing plate 76 are aligned with existing apertures of the seat assembly for attachment using the Christmas-tree fastener method. The control module 107 and pump 109 are then connected beneath the lower frame 54 of the seat assembly.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:

a seat backframe having a plurality of attachment holes formed therethrough;

a trim cover having an attachment strip with a plurality of trim attachment apertures therethrough;

a plurality of fasteners cooperating with said attachment holes and with said trim attachment apertures for securing the trim cover to the backframe;

a support bladder subassembly secured to the backframe by the fasteners, said subassembly including a backing plate with first and second lumbar support bladders secured to the backing plate; and wherein said backing plate comprises a plurality of backing plate attachment apertures formed therethrough for cooperation with said plurality of fasteners, and said support bladder subassembly further comprising first and second lateral support bladders secured to the backing plate.

2. The vehicle seat assembly of claim 1, further comprising:
   a plurality of tubes connected to the lateral and lumbar support bladders;
   a pump connected to the tubes for pumping air into the bladders; and
   a control module in electrical communication with the pump for selectively operating the pump.

3. The vehicle seat assembly of claim 1, further comprising a central opening formed in the backframe, and means for attaching the backing plate to the central opening for holding the subassembly in position prior to installation of the fasteners, and wherein said fasteners comprise barbed type fasteners.

4. The vehicle seat assembly of claim 1, wherein said backing plate is at least partially positioned between said trim cover and said backframe.

5. A lateral and lumbar support subassembly for attachment to a vehicle seat assembly including a backframe having attachment holes formed therethrough and a trim cover secured to the backframe by barbed fasteners, the subassembly comprising:
   a backing plate secured to the backframe by the barbed fasteners; and
   first and second lateral support bladders and first and second lumbar support bladders secured to the backing plate.

6. The subassembly of claim 5, wherein said backing plate comprises a plurality of attachment apertures formed therethrough for cooperation with the barbed fasteners.

7. The subassembly of claim 5, further comprising:
   a plurality of tubes connected to the lateral and lumbar support bladders;
   a pump connected to the tubes for pumping air into the bladders; and
   a control module in electrical communication with the pump for selectively operating the pump.

8. The subassembly of claim 5, wherein said backing plate is at least partially positioned between said trim cover and said backframe.

9. A method of assembling lateral and lumbar support bladders in a vehicle seat assembly, comprising:
   providing a seat backframe having a plurality of attachment holes formed therethrough, as well as a central aperture formed therethrough;
   pre-attaching a lateral and lumbar support bladder subassembly to the central opening in the backframe, wherein the subassembly includes a backing plate with first and second lateral support bladders and first and second lumbar support bladders secured to the backing plate, and wherein the backing plate includes a plurality of backing plate attachment apertures formed therethrough; and
   simultaneously securing a trim cover and the backing plate to the seat backframe by inserting a plurality of fasteners through a portion of the trim cover, and further through the plurality of backing plate attachment apertures and through the attachment holes in the seat backframe.

10. A vehicle seat assembly, comprising:
    a seat backframe having a central opening formed therein;
    a trim cover attached to the backframe;
    a plurality of fasteners attaching the trim cover to the backframe;
    a support bladder subassembly attached by said plurality of fasteners to the backframe, said subassembly including a backing plate with first and second lumbar support bladders secured to the backing plate; and
    means for attaching the backing plate to the central opening of the backframe for holding the support bladder subassembly in position prior to installation of said fasteners.

* * * * *